A. MITCHELL.
PLOW LIFTING MECHANISM.
APPLICATION FILED FEB. 24, 1920.
1,392,196.
Patented Sept. 27, 1921.
3 SHEETS—SHEET 3.
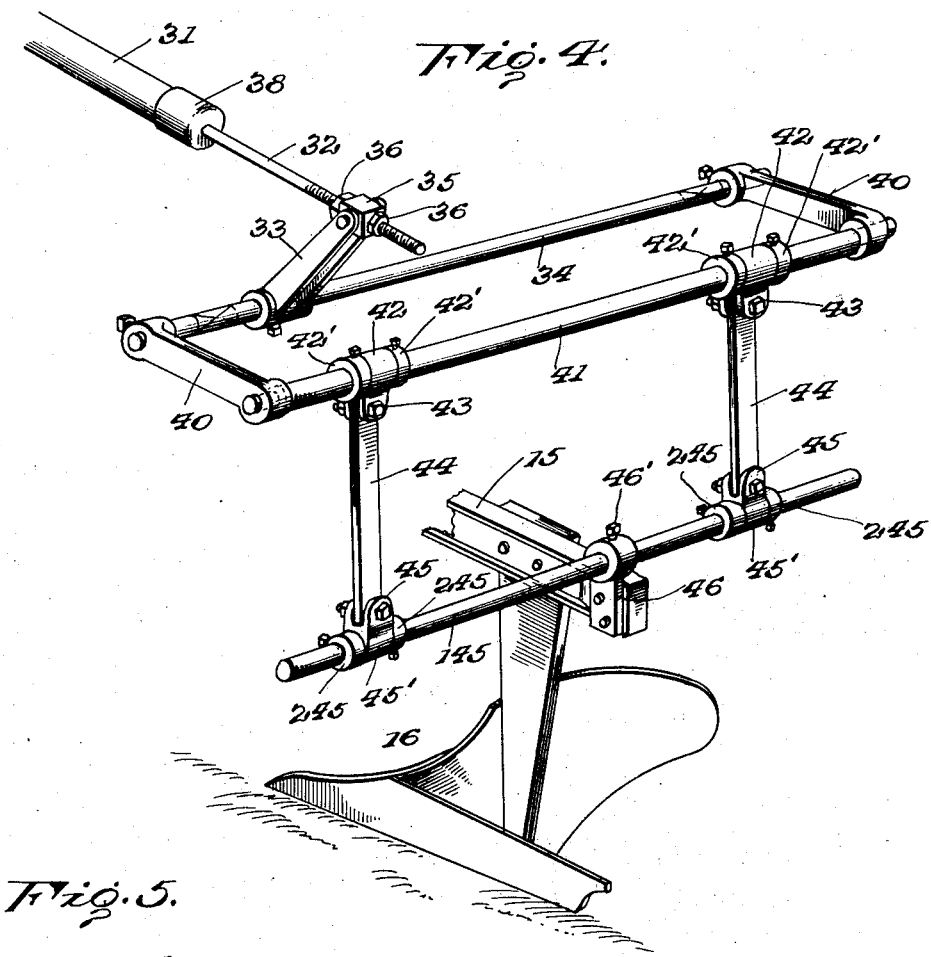
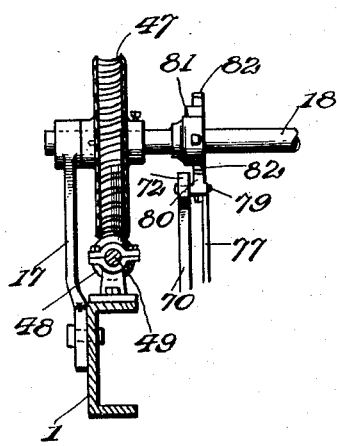
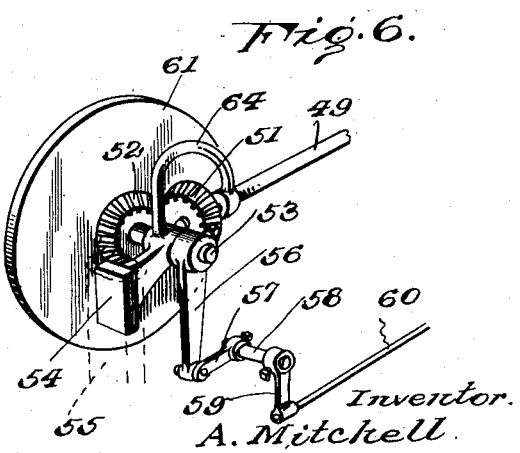
Inventor.
A. Mitchell
by
Lacey & Lacey
his Atty's

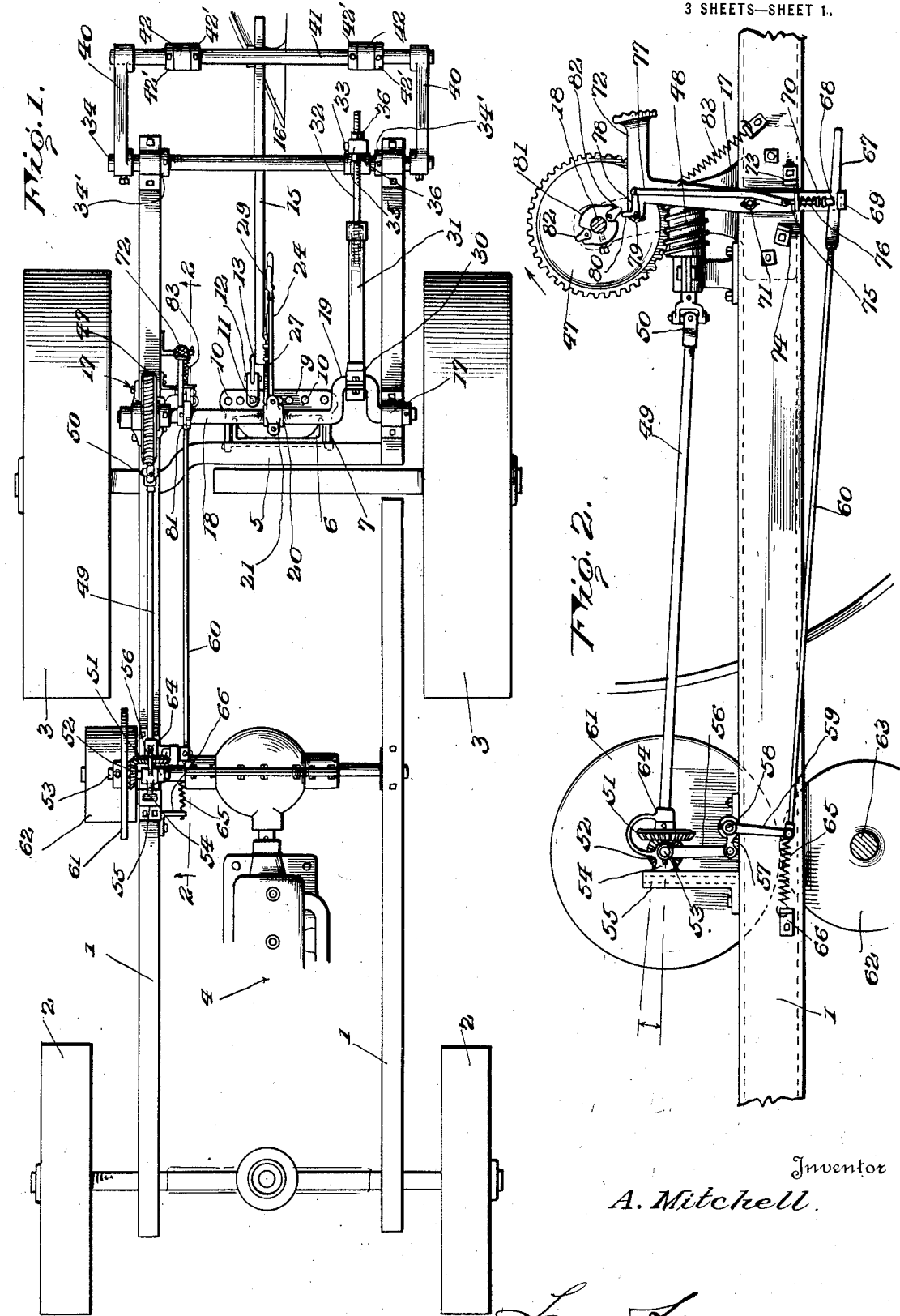

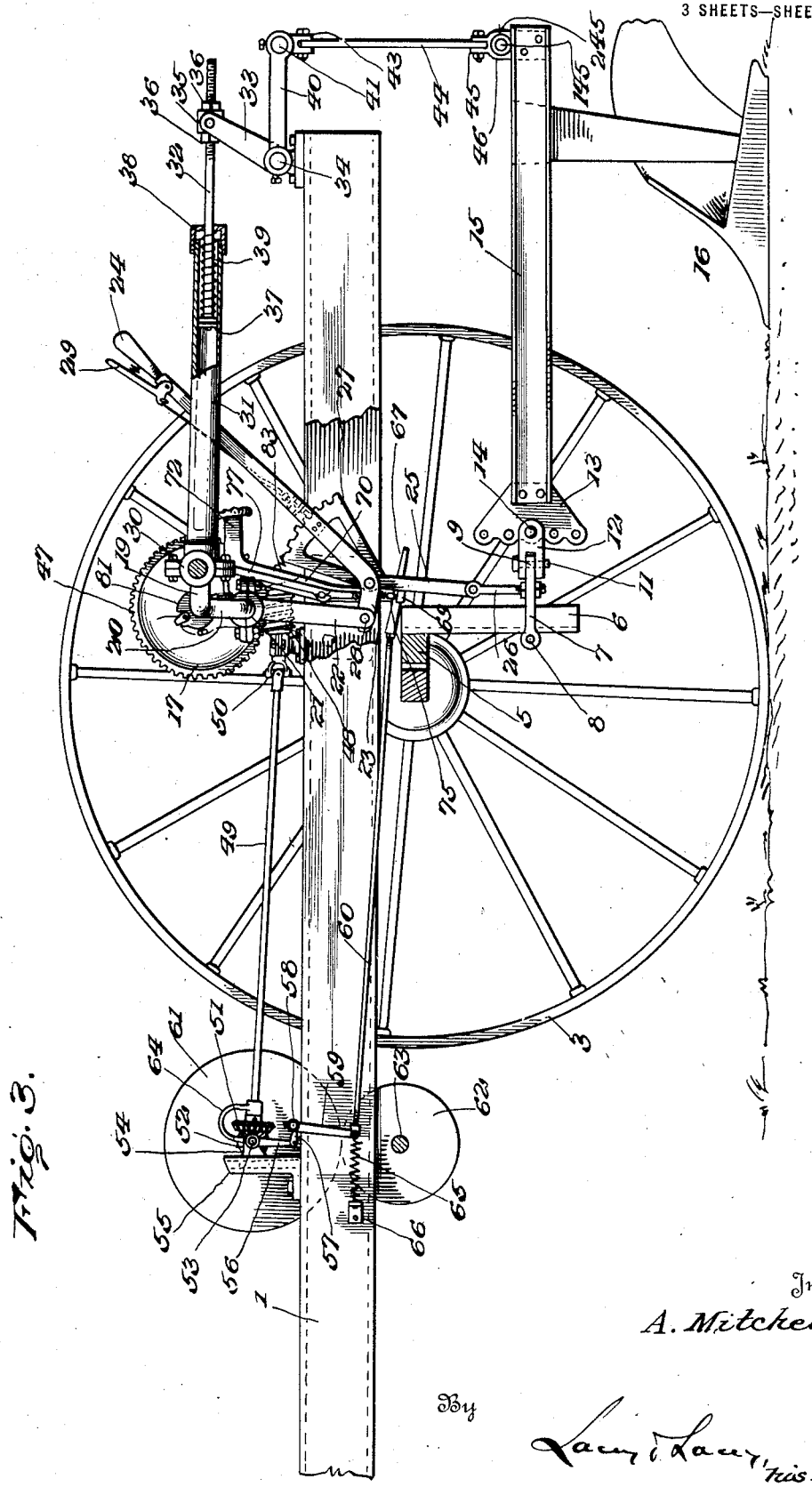

UNITED STATES PATENT OFFICE.

ALEXANDER MITCHELL, OF PUEBLO, COLORADO, ASSIGNOR TO THE ALEX MITCHELL MOTOR PLOW COMPANY, A CORPORATION OF COLORADO.

PLOW-LIFTING MECHANISM.

1,392,196.     Specification of Letters Patent.     Patented Sept. 27, 1921.

Application filed February 24, 1920. Serial No. 360,747.

*To all whom it may concern:*

Be it known that I, ALEXANDER MITCHELL, a citizen of the United States, residing at Pueblo, in the county of Pueblo and State of Colorado, have invented certain new and useful Improvements in Plow-Lifting Mechanism, of which the following is a specification.

This invention relates to power-driven plows and has special reference to the means for raising and lowering the plows, the object being to provide mechanism whereby the plows may be adjusted vertically by the use of power from the engine which drives the machine over the field. Another object of the invention is to provide means for maintaining the plows at a uniform depth while at work, and a further object of the invention is to provide means whereby the plow beams may be maintained parallel with the main carrying frame and horizontal or lateral movement of the plows permitted whereby cramping of the plow frame will be avoided.

The stated objects of my invention and other objects which will incidentally appear in the course of the following description are attained in mechanism such as is illustrated in the accompanying drawings and the invention resides in certain novel features which will be particularly pointed out in the claims following the description.

In the drawings—

Figure 1 is a plan view of one embodiment of my present invention, parts of the machine not necessary to a disclosure of the invention being omitted;

Fig. 2 is an enlarged longitudinal section on the line 2—2 of Fig. 1;

Fig. 3 is an enlarged view, partly in elevation and partly in section, of a mechanism embodying the invention;

Fig. 4 is an enlarged detail perspective of the plow suspension;

Fig. 5 is a detail section showing one of the supports for the main crank shaft;

Fig. 6 is a detail perspective of a portion of the actuating gearing.

The main frame of my machine embodies channeled side bars 1 which are suitably joined at intervals by cross beams (not shown) and supported, parallel with the ground, by steering wheels 2 and propelling wheels 3. A power plant is supported upon the forward end of the main frame and a portion of this plant is shown conventionally at 4, the wheels 3 being driven by said plant through gearing which forms no part of my present invention and is preferably of the type disclosed in an application for patent on adjusting mechanism for motor plows filed by me December 6, 1919, Serial No. 342,897.

In carrying out my present invention, I permanently secure to the axle member 5 a depending yoke 6 upon which is slidably mounted a draw bar 7 consisting substantially of a U-shaped frame having its end members slidably disposed at the sides of the yoke 6 and connected by a pin 8 in advance of said yoke. The rear connecting bar 9 of this draw bar is provided with a plurality of openings 10 in any one of which is fitted a pin 11 to pivotally connect a clevis 12 to the draw bar. An intersecting clevis 13 is connected to the rear end of the clevis 12 by a pivot pin 14 and the said clevis 13 is secured rigidly to the front end of a plow beam 15, as shown. The pins 11 and 14 constitute pivots about which the parts engaged by them may swing or turn and it will be readily noted that the arrangement illustrated permits the plow beam 15 to swing in both a vertical and a horizontal plane. While, in the accompanying drawings, I have shown only one plow beam 15 it will, of course, be understood that in actual use a plurality of beams will be provided and these beams will all be connected by a similar arrangement of clevises with the draw bar, the number of beams being limited only by the capacity of the machine to accommodate the beams without causing interference between the several plows 16 carried by the beams.

Mounted upon the side bars 1 in suitable bearings 17 is a shaft 18 provided adjacent one end with a crank 19 and at about its center with a crank 20 arranged at a right angle to the crank 19, as shown most clearly in Fig. 3. Upon the crank 20 is rotatably fitted the upper end 21 of a link or hanger 22 to the lower end of which is pivoted the extremity of a forwardly extending toe 23 constituting the terminal of a hand lever 24 which extends upwardly to a point where it may be conveniently manipulated by the driver who may be carried upon the main frame of the machine. At the angle of the main portion of the lever 24 with its toe 23, I pivotally attach a link 25, the lower end of which is pivoted to a second link 26 which extends through and is secured rigidly to the draw bar 7 as will be readily understood on reference to Fig. 3. A quadrant 27 extends upwardly from the pivot 28 and is integral with the link 25. A latch 29 is carried by the lever 24 to engage said quadrant and thereby hold the lever in a set position. The pivot pin 28 serves as a fulcrum for the lever 24 and the operator, by swinging the lever about its fulcrum, may shorten or lengthen the distance between the points 8 and 21 which raises or lowers the front ends of the plow beams accordingly. When the lever is set, the distance between the crank 20 and the draw bar 7 will be fixed and a firm unvarying connection between said parts is provided through the hanger 22, the lever 24, quadrant 27, and links 25 and 26.

Fitted to the crank 19 for relative rotary movement is the front end 30 of a tubular member 31 in the rear portion of which is slidably fitted a rod 32, the said tube 31 and the rod 32 together constituting a telescoping pitman by which the crank 19 is connected to a crank 33 rising from a rock shaft 34 which is journaled in suitable bearings upon the rear ends of the side bars 1 of the main frame. The rod 32 is connected with the crank 33 by being inserted through a sleeve 35 which is pivotally attached to the free extremity of the crank and nuts 36 mounted upon the rod are then turned home thereon against the opposite ends of the sleeve so as to obtain the desired effective length in the pitman. The forward end of the rod 32 is provided with a head 37 and the end of the tube 31 is closed by a cap 38 through which the rod passes, a spring 39 being coiled around the rod within the tube between the cap 38 and the head 37 and serving as a cushion to relieve the parts from sudden strain from the crank 19 when the lifting mechanism is set in motion. To the ends of the rock shaft 34, I secure rearwardly extending crank arms 40 and extending between the free ends of said arms 40 is a rock shaft 41 having collars 42 fitted thereon and held against endwise movement by stop collars 42', as shown. The collars 42 are each constructed with depending lugs or ears 43 to which are pivoted the upper ends of links 44, the lower ends of said links being pivoted to similar ears 45 on collars 45' which form bearings for a shaft 145 which is fitted in lugs 46 on the plow beams 15 and held therein by set screws 46'. The collars 45' have turning movement relative to the shaft 145 but are held against endwise movement by stop collars 245 which are spaced so as to correspond to the spacing of the stop collars 42'. The described arrangement permits the plow beams to swing horizontally while maintaining their parallelism. Stop collars 34' prevent endwise movement of the shaft 34.

Upon the end of the crank shaft 18 more remote from the crank 19, I secure a worm gear 47 which meshes with a worm 48 suitably supported below it and secured on the rear end of a shaft 49, said shaft being constructed in two sections or members connected by a universal joint 50, as shown and as will be readily understood. Upon the front end of this shaft 49 is secured a beveled pinion 51 which meshes with a similar pinion 52 fixed to a short shaft 53 which is carried by a bracket 54 slidably mounted in a standard 55, erected upon the side bar 1, and supported by a link 56 pivoted to and rising from a crank 57 on a rock shaft 58, the said shaft 58 being journaled in a suitable bearing secured to the side bar 1 and provided with a depending crank 59 pivoted to the front end of a controlling rod 60. The shaft 53 carries at its outer end, a friction disk 61 which is disposed above and adapted to bear upon a belt pulley or wheel 62 upon the end of the transmission shaft 63 of the power plant so that when the shaft 53 is in a lowered position with the disk 61 bearing upon the pulley 62, the power of the engine will be utilized to rotate the crank shaft 18 and thereby raise or lower the plows. The front end of the shaft 49 is mounted in a bracket 64 extending from the sliding bracket 54 whereby said shaft will follow the movement of said bracket and its front end will be prevented from dropping. A spring 65 is secured to the front end of the controlling rod 60 and to the side bar 1, or to a lug 66 on the said side bar in advance of the crank 59, and holds the rod normally in a forward position so that the link 56 will be held raised and the disk 61 will, consequently, normally be out of engagement with the pulley 62. The rear end of the controlling rod 60 is flattened, as shown at 67, and is provided with a notch or recess 68 in its upper side. The said flattened rear end of the controlling rod is slidably supported in a cup or keeper 69 formed on the lower end of a lever 70 which is fulcrumed, as indicated at 71, upon the adjacent side bar 1 and is constructed at its upper end with a rearwardly extending pedal 72. Stops 73 and 74 are provided upon the adjacent side bar 1 in rear and in advance of the lever 70 to limit the throw of the same and a latch pin 75 is slidably mounted upon the lever and has its lower end arranged to engage the notch or recess 68, as clearly shown in Fig. 2. A spring 76 is coiled around the latch 75 between suitable abutments upon the same and upon the lever so that it will normally project the latch to engage the recess 68. To the upper end of the latch pin 75, I pivot a link 77 which extends upwardly to the rearwardly extending arm 78 of an angle lever which is pivoted at 79 upon the forward extremity of the pedal 72 and has its free arm 80 extending upwardly so as to be engaged by a trip on the crank shaft 18. This trip comprises a collar or body 81 which is secured to the crank shaft in any desired position and carries diametrically opposite dogs 82 which are so mounted that upon rotation of the crank shaft they will press against the upstanding arm 80 of the angle lever and rock the angle lever so as to exert a pull through the link 77 and thereby lift the latch 75 out of its engagement with the recess 68. A spring 83 is attached to the side bar 1 and to the lever 70 above the fulcrum thereof and exerts a rearward pull upon the said lever which sets the pedal for the next operation.

As previously stated, the spring 65 holds the controlling rod 60 in its forward position so that the bracket 54 will be raised and the friction disk 61 held out of engagement with the constantly rotating driving pulley 62. The worm gearing acts as a brake when at rest to prevent the weight of the plows turning the shaft 18 and it is to be noted that the cranks 19 and 20 are, when at rest, respectively, in the line of the pull exerted thereon and, consequently, will not tend to effect rotation of the shaft. If it be desired to raise the plows, the operator pushes forward upon the foot lever or pedal 72 so that the lever 70 will be swung about its pivot in opposition to the tension of the spring 83. The engagement of the latch 75 with the recess 68 will thereupon move the controlling rod 60 rearwardly against the tension of the spring 65 and the shaft 58 will be rocked so that the link 56 will be lowered and the shaft 53 carried downwardly with said link to bring the friction disk 61 into engagement with the pulley 62. Motion will then be at once transmitted through the disk 61, the gears 52 and 51, and the shaft 49 to the worm 48 so that the worm gear 47 will be rotated and the shaft 18 then turned in the direction indicated by the arrow in Fig. 2. When the shaft 18 has made one-half a revolution, one of the dogs 82 will be brought against the upstanding arm 80 and the angle lever will be rocked so that the arm 78 thereof will be swung upwardly, pulling upon the link 77 and withdrawing the latch 75 from the recess 68. As soon as the lower end of the latch clears the recess 68, the spring 65 will contract and the controlling rod will be drawn forwardly thereby causing upward movement of the crank 57 and the parts immediately connected therewith so that the disk 61 will be lifted out of engagement with the pulley 62. The rotation of the shaft 49 will then, of course, cease and the operator may remove his foot from the pedal 72 whereupon the spring 83 will at once return said pedal and the lever 70 to their initial normal positions and the latch 75 will again engage the recess 68. The parts will remain at rest until the pedal is again pushed forwardly whereupon the shaft 18 will be again set in motion and will complete its revolution. With the parts in the position shown in Fig. 3, it will be readily understood that when the lower end of the crank 20 swings forwardly it also at once begins to move upwardly and this upward movement will continue until the crank has assumed a position diametrically opposite that shown in Fig. 3, although during the latter half of its movement the crank will be moving rearwardly. It will thus be seen that the link or hanger 22 and the parts connected with the lower end thereof will be drawn upwardly during the first described movement of the crank shaft 18 and upon the second described movement of said shaft the said parts will move downwardly. It will also be readily noted that as the end of the crank 18 in engagement with the telescopic pitman moves downwardly from the position shown in Fig. 3 it will also move forwardly so that notwithstanding the downward movement of the front end of the pitman, the pitman as a whole, after taking up the slack permitted by the spring 39, will move forwardly and will, consequently, exert a rocking movement upon the shaft 34 through the crank 33 which in turn will cause an upward movement of the crank arms 40 and the links 44. The plow beams will thus be raised without being shifted from their horizontal position or losing their parallelism with the frame and likewise when the plows are again lowered the parallelism of the beams will be maintained. When the plows are lowered, they may float vertically without putting any stress on any part of the machine except the draw bar.

My improved mechanism will relieve the operator of all the strain incident to vertical adjustment of the plows and the entire operation of raising or lowering the plows will be performed by the power plant mounted upon the front end of the main frame. One movement of the pedal 72 will lower the plows to working position and the next movement of the pedal will raise them to permit them to turn a corner or be carried to another field. The employment of my plow-adjusting mechanism will not interfere in any way with the efficiency of the plow in turning over the soil nor will it impose any excessive additional strain upon the motor. The parts of my plow lifting mechanism are compactly arranged and are simple in their construction so that they may be installed upon the plow at a low cost, and in use the action of the mechanism ceases automatically when the plows have been raised or lowered so that the operator is not compelled to watch the action.

Having thus described the invention, what is claimed as new is:

1. The combination with a wheel-supported frame, of a plow, a motor on the frame, a rotatable member mounted upon the frame, operative connections between said member and the plow, means driven by the motor for rotating said member in one direction, and means movable with said last-mentioned means for interrupting the rotation of said member whereby a partial rotation will raise the plow and further rotation in the same direction will lower the plow.

2. The combination with a wheel-supported frame, of a plow carried by said frame, a member mounted on said frame for movement in a vertical plane, means for actuating said member, a hanger suspended on and depending from said member, a hand lever constructed at its lower end with a toe pivotally attached to the lower end of said hanger, a jointed connection between the angle of said lever and the front end of the plow, a quadrant fixed relatively to the upper end of said jointed connection, and a latch mounted upon the lever to engage said quadrant.

3. The combination with a wheel-supported frame, of a rock shaft mounted thereon, arms extending rearwardly from said shaft, a second rock shaft mounted in and extending between the free ends of said arms, collars secured upon the second shaft, links pivoted to and depending from said collars, a plow having a pivotal connection with the lower ends of said links, means upon the main frame for actuating the first-mentioned rock shaft, and means upon the frame for suspending the front end of the plow.

4. The combination of a wheel-supported frame, a rock shaft mounted upon the rear portion of said frame, a plow disposed below the frame, connections between said rock shaft and the plow whereby to support the rear portion of the plow, a crank rising from the rock shaft, a telescopic pitman having one member adjustably and pivotally connected with the upper end of said crank, a multiple crank shaft mounted upon the frame in advance of the said rock shaft and having one crank pivotally engaged in the front end of said pitman, and means connecting another crank of said shaft with the front end of the plow.

5. The combination of a supporting frame, a crank shaft mounted upon said frame, connections between the cranks of said shaft and a plow whereby to suspend the plow from the frame, means for rotating said shaft, setting means for permitting the rotating means to operate, and means movable with the rotating means to engage the setting means for automatically arresting the rotation of said shaft.

6. The combination of a supporting frame, a plow, means for suspending the plow from said frame including a crank shaft and connections between cranks of said shaft and the front and rear portions of the plow, and means for rotating said crank shaft comprising a friction disk, gearing connecting said disk with the crank shaft, means for moving said disk into engagement with a pulley driven by the power plant of the plow, means for normally holding said disk out of engagement with said pulley, and means for automatically releasing the means for moving the disk into engagement with the pulley.

7. The combination of a supporting frame, a crank shaft mounted thereon, a plow, connections between the cranks of said shaft and the front and rear portions of the plow, means for rotating the crank shaft including a friction disk, and gearing connecting said disk with the crank shaft, a driving pulley with which the friction disk is adapted to engage, a vertically movable support for the friction disk, a controlling rod, connections between said controlling rod and the support for the friction disk, means for holding said controlling rod normally in a forward position whereby the disk is held out of engagement with the driving pulley, a lever fulcrumed upon the supporting frame, a latch normally connecting said lever with the controlling rod whereby said rod may be moved to permit the friction disk to engage the driving pulley, and a trip on the crank shaft arranged to withdraw said latch from its engagement with the controlling rod.

8. The combination of a supporting frame, a multiple crank shaft mounted on the frame, a plow, connections between the cranks of said shaft and the front and rear portions of the plow, means for rotating the crank shaft, a controlling rod, connections between said controlling rod and said rotating means, means acting on the controlling rod to hold the rotating means normally inactive, a foot lever mounted on the supporting frame, a latch carried by said lever and normally engaging the controlling rod, and a trip on the crank shaft arranged to engage said latch and release it from the controlling rod.

9. The combination of a supporting frame, a plow, means for suspending the plow from the frame and vertically adjusting the same including a shaft mounted on the frame, means for rotating said shaft, a controlling rod, connections between said controlling rod and said rotating means, means acting on the controlling rod to hold the rotating means normally inactive, a setting member mounted on the supporting frame, a latch carried by the setting member and normally engaging the controlling rod, and a trip on the shaft arranged to engage said latch and release it from the controlling rod.

In testimony whereof I affix my signature.

ALEXANDER MITCHELL. [L. S.]